United States Patent
Chong, Jr. et al.

(10) Patent No.: US 7,240,172 B2
(45) Date of Patent: Jul. 3, 2007

(54) SNAPSHOT BY DEFERRED PROPAGATION

(75) Inventors: Fay Chong, Jr., Cupertino, CA (US); Whay Sing Lee, Newark, CA (US); Raghavendra J. Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 704 days.

(21) Appl. No.: 10/360,297

(22) Filed: Feb. 7, 2003

(65) Prior Publication Data

US 2004/0158566 A1  Aug. 12, 2004

(51) Int. Cl.
*G06F 12/00* (2006.01)

(52) U.S. Cl. .................. 711/162; 711/154; 711/161; 711/162; 711/165; 707/100; 707/101; 707/200; 707/201; 707/202; 707/204

(58) Field of Classification Search ........... 711/154, 711/161, 162, 165; 707/100, 101, 200, 201, 707/202, 204

See application file for complete search history.

(56) References Cited

U.S. PATENT DOCUMENTS

| | | | |
|---|---|---|---|
| 5,263,154 A | 11/1993 | Eastridge et al. | |
| 5,276,860 A | 1/1994 | Fortier et al. | |
| 5,410,667 A | 4/1995 | Belsan et al. | |
| 5,720,026 A | 2/1998 | Uemura et al. | |
| 6,044,367 A | 3/2000 | Wolff | |
| 6,057,545 A | 5/2000 | Sugiyama | |
| 6,304,903 B1 * | 10/2001 | Ward | 709/224 |
| 6,336,134 B1 * | 1/2002 | Varma | 709/205 |
| 6,338,114 B1 * | 1/2002 | Paulsen et al. | 711/112 |
| 6,397,308 B1 | 5/2002 | Ofek et al. | |
| 6,484,186 B1 | 11/2002 | Rungta | |
| 6,532,479 B2 | 3/2003 | Souder et al. | |
| 6,606,629 B1 | 8/2003 | DeKoning et al. | |
| 6,883,074 B2 | 4/2005 | Lee et al. | |
| 6,978,353 B2 | 12/2005 | Lee et al. | |
| 2003/0140210 A1 | 7/2003 | Testardi | |
| 2004/0062106 A1 | 4/2004 | Ramesh et al. | |
| 2004/0064463 A1 | 4/2004 | Rao et al. | |
| 2004/0078533 A1 | 4/2004 | Lee et al. | |
| 2004/0117567 A1 | 6/2004 | Lee et al. | |
| 2005/0044336 A1 * | 2/2005 | Shimada et al. | 711/170 |
| 2005/0120036 A1 * | 6/2005 | Verma et al. | 707/100 |

OTHER PUBLICATIONS

"Sun StorEdge Instant Image Software Architecture Guide," 52 pages (Dec. 2001).

* cited by examiner

*Primary Examiner*—Stephen C. Elmore
*Assistant Examiner*—Daniel Kim
(74) *Attorney, Agent, or Firm*—Dorsey & Whitney LLP (57) ABSTRACT

An embodiment of the invention provides a method for creating a snapshot of a data store. A command to create a snapshot of an original data store, stored to a parent virtual logical unit (VLU), is received. A deferred propagation data structure (DPDS) is associated with the parent VLU. The DPDS is capable of containing data propagation records and separators, each data propagation record contains a previous version of one or more data blocks of the parent VLU, each separator contains a pointer to a particular child VLU storing a snapshot of the original data store and separating the data propagation records pertaining to the particular child VLU. A child VLU to store the copy of the original data store is created. A new separator containing a pointer to the child VLU is created in the DPDS. A search pointer pointing to the DPDS is implemented in the child VLU.

31 Claims, 7 Drawing Sheets

SNAPSHOT BY DEFERRED PROPAGATION

FIELD

Embodiments of the invention relate generally to the field of data storage and more particularly to methods for efficiently maintaining a set of point-in-time copies (snapshots) of a data store.

BACKGROUND

The continued increase in data storage has been accompanied by an increasing need to have an accurate record of the state of particular data stores at specified times. A snapshot is a point-in-time image of a given data store. Snapshots may be created to effect recovery of data upon a catastrophic failure or to maintain a record of the state of the data at given times. Typical data storage systems may have a capacity of a terabyte (TB) or more. Such storage may be organized as a number of storage units of more practical size known as virtual logical units (VLUs). VLUs have their own well-defined virtual block address (VBA) space, and typically range in size upward from several hundred megabytes (MB). A snapshot may be created for an original VLU (parent VLU) at a user-specified time. The snapshot VLU (child VLU) then contains an exact copy of the parent VLU at the specified time. This child VLU can be accessed and modified just like any other VLU.

A basic approach to creating a snapshot is to make an actual copy of the entire VLU. For example, upon receiving a command to snapshot a VLU, all new data access requests (I/O requests—READs and WRITEs) to that VLU are halted, a child VLU of the same size is created, and the entire content of the parent VLU is copied into the child VLU. Both VLUs are then available to the user. Copying the contents of one VLU to another to create a snapshot is both time-consuming and an inefficient use of storage space. For example, a 1 TB VLU may require several hours or even days to completely copy, during which time the parent VLU is unavailable for data access. Moreover, the storage space required for the child VLU is equal to the size of the parent VLU.

Another typical approach is the "copy-on-write" approach, wherein data is not copied immediately when the snapshot command is received. Rather, a new VLU is created without actually allocating to it a full amount of storage space (i.e., an amount of storage space that is equivalent to the size of the parent VLU). In such a system, when a WRITE operation is received, the system first checks to see if the requested data block has already been copied into the child VLU. If the block has not yet been copied to the child VLU, the system explicitly makes the copy before allowing the requested operation to be serviced. A bitmap may be used to keep track of the data blocks that have been copied. A variant of this approach is for the system to initiate a background copying operation when the snapshot command is received without stopping the processing of new data access requests. This approach alleviates the problem of the VLU being inaccessible for long periods, but is still space inefficient.

A typical data storage system contains an array of disk drives, a controller for controlling access to the disk array, and a cache memory for storing recently accessed data so as to provide quick access to data that is likely to be accessed in the near-term without having to access the disk on every occasion. Since a particular file or block of data may be located on the disk or in the cache, the storage device typically includes metadata (MD) that registers all data blocks currently in the cache and, therefore, indicates whether a data block is on the disk or stored in cache. If the data block is in the cache, the MD indicates where the data block is stored in the cache. The MD may also indicate the current state of the data block (e.g., whether or not it has been "flushed" to disk). For such a system, another typical approach to creating a snapshot is to create a copy of the MD of the parent VLU when the snapshot command is received. The new copy of the MD is then assigned to the child VLU. With this approach, data access to the parent VLU is interrupted only long enough to make a copy of the MD. That is, because both copies of the MD point to the same data, the child VLU presents an image that is identical to the parent VLU immediately after the MD is copied. Thus, both the parent VLU and the child VLU can be made available to the user as soon as the MD is copied. Subsequently, if a WRITE is received for either VLU, the system checks to see if the MD of the child VLU and the MD of the parent VLU for the corresponding VBA are still pointing to the same data blocks. If not, the WRITE operation proceeds normally. Otherwise, a copy of the data block involved is made, and linked into the metadata for the child VLU before the WRITE operation is permitted to proceed. A bitmap or scoreboard may be used to keep track of the blocks that have been copied. Alternatively, the MD need not be entirely copied when the snapshot command is received. Instead, space for the MD and the bitmap is allocated, but left empty. A cleared "copied" bit implicitly indicates that a corresponding MD entry in the child VLU is identical to that in the parent VLU. An MD entry for the child VLU is filled in after the corresponding data block is copied. With such an approach, the time during which data access is interrupted is reduced because a relatively small amount of information (i.e., the MD) is copied before the VLUs are made available to the user again. Copying only the MD also has the advantage of needing only as much new disk storage space as the amount of changes made to the VLUs after the snapshot is created.

Figure 1:
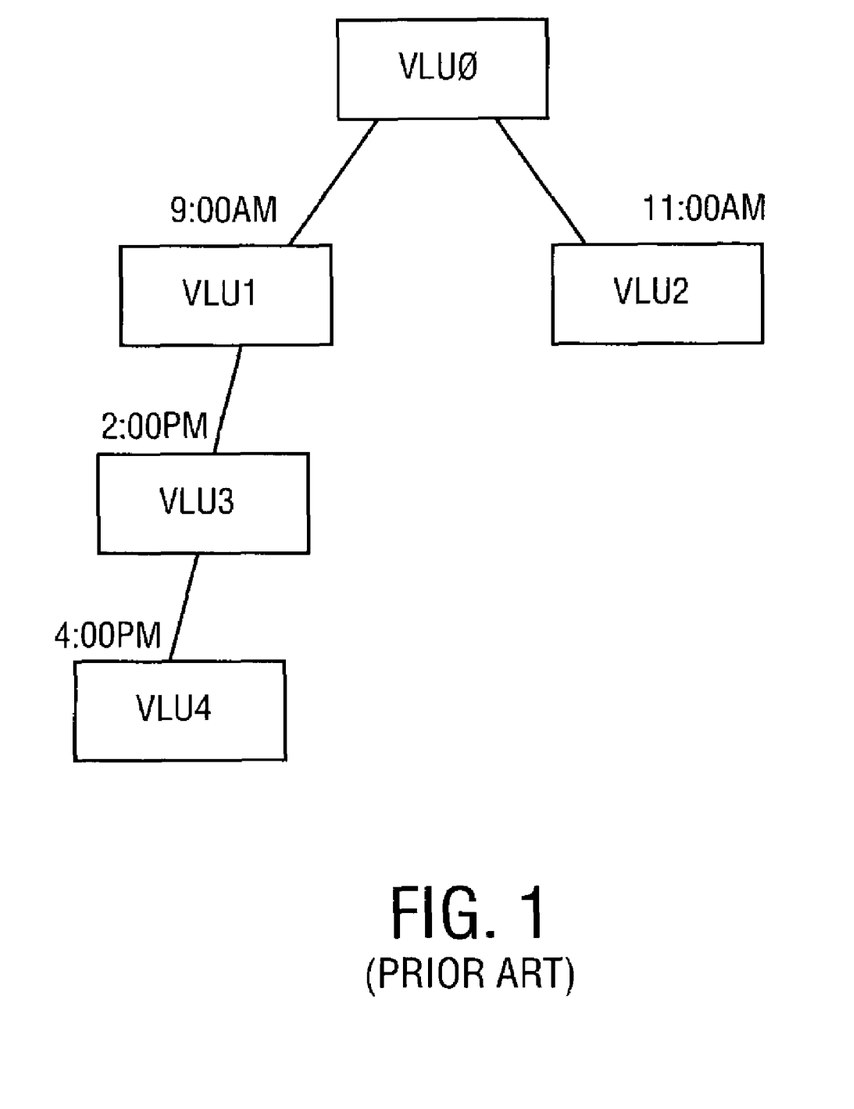
FIG. 1 illustrates an example of a succession of cascaded snapshots in accordance with the prior art.

These solutions are quite efficient when there are a small number of snapshots in the system, but less so when multiple READ-WRITE-enabled snapshots are taken. This is frequently the case for cascaded snapshots of an original VLU. Cascaded snapshots are a succession of snapshots where each subsequent snapshot is a point-in-time copy of the preceding snapshot. FIG. 1 illustrates an example of a succession of cascaded snapshots in accordance with the prior art. In FIG. 1, VLU1 is a snapshot of VLU0 created at 9:00 A.M. VLU3 is a snapshot of VLU1 created at 2:00 P.M. Note VLU3 is a snapshot of a snapshot (i.e., VLU1) as opposed to VLU2, which is a later snapshot of the original VLU (i.e., VLU0). A subsequent snapshot VLU created from the same parent VLU is referred to as a sibling VLU. For example, VLU1 and VLU2 are siblings. To continue, VLU4 is a snapshot of VLU3 created at 4:00 P.M. VLUs VLU0, VLU1, VLU3 and VLU4 form a snapshot cascade. Cascaded snapshots are often employed in particular data-use situations that share common characteristics. For example, consider a complex computation or simulation application that takes a long time (e.g., 10 days) to run to completion. At some point it may be desirable to have the simulation branch in several different directions with small variations in one or more parameters. Subsequently it may be desirable to alter different parameters in each of the branches. For these applications, the subsequent child snapshots (i.e., cascaded snapshots) may often be used as original VLUs, on which more simulations are run. In such cases the data access pattern will likely be a mix of READs and WRITEs, and the performance of the active VLU and its children become equally important. The method of creating snapshots should avoid penalizing one or the other. That is, since each VLU may be actively used (receive READs and WRITEs), the performance of the parent and child(ren) VLUs should be optimized, while optimizing capacity is not as critical since there will be changes to the data of the VLUs anyway.

SUMMARY

An embodiment of the present invention provides a method for creating a point-in-time copy of a data store. A command to create a point-in-time copy of an original data store, the original data store stored to a parent virtual logical unit (VLU), is received. The parent VLU having associated therewith a deferred propagation data structure. The deferred propagation data structure is capable of containing a plurality of data propagation records and a plurality of separators, each data propagation record containing a previous version of one or more data blocks of the parent VLU, each separator containing a pointer to a particular child VLU storing a point-in-time copy of the original data store and separating the data propagation records pertaining to the particular child VLU. A child VLU to store the point-in-time copy of the original data store is created. A new separator containing a pointer to the child VLU is entered into the data propagation data structure. And a search pointer pointing to the deferred propagation data structure is implemented in the child VLU.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

An embodiment of the present invention implements a deferred propagation method of maintaining a snapshot in an environment in which multiple VLUs are READ/WRITE-enabled. When a WRITE operation to a parent VLU is received, the existing version of the affected data (history) is not immediately propagated to the children VLUs. Instead, the history is stored in a time-ordered fashion in a data structure that is accessible to all of the children. In one embodiment, the time-ordered data structure is a software-implemented first-in-first-out (FIFO). In such an embodiment, a "deferred propagation FIFO" (DPF) and a "copied since last snapshot" (CSLS) bitmap are created in an active VLU at the time the first snapshot of the VLU is created. The DPF contains the history and address for each altered data block, (such records containing history and address being referred to henceforth as propagation records), along with one or more pointers to respective snapshot VLUs (such pointers being referred to henceforth as separators). The CSLS contains a bitmap to indicate, for each data block, whether a propagation record has been entered into the DPF subsequent to the creation of the most recent snapshot of the corresponding VLU.

In one embodiment, the MD structure for each VLU includes a tree of MD slabs. The tree of MD slabs is organized as described in co-pending U.S. patent application Ser. No. 10/261,545, filed on Sep. 30, 2002. In such organization, the tree of MD slabs has a plurality of nodes (slabs), each node containing an MD table. Each of the MD tables has a plurality of entries. Each of the entries in the MD table represents a contiguous range of block addresses and contains a pointer to a cache slot storing a data block corresponding to the block address, or an indicator to indicate that the corresponding data block is not stored in an NVRAM cache slot. Each MD table also contains a block address range indicator to indicate the contiguous range of block addresses, and at least one pointer to point to any parent or child nodes.

An intended advantage of one embodiment of the present invention is to exploit particular data-access patterns of an environment where children VLUs are READ/WRITE enabled to improve the performance of both the parent VLU and its children VLUs. Another intended advantage of one embodiment of the present invention is to reduce the time between when a WRITE operation to a parent VLU is received, and when the update can be performed. Another intended advantage of one embodiment of the present invention is to decrease the time necessary to complete a READ operation by reducing the number of places the controller needs to search for the requested data. Another intended advantage of one embodiment of the present invention is to reduce the amount of data and MD (and hence the amount of NVRAM allocated for MD storage) that is copied in response to a snapshot command.

In the following description, numerous specific details are set forth. However, it is understood that embodiments of the invention may be practiced without these specific details. In other instances, well-known structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Deferred Propagation

Figure 2:
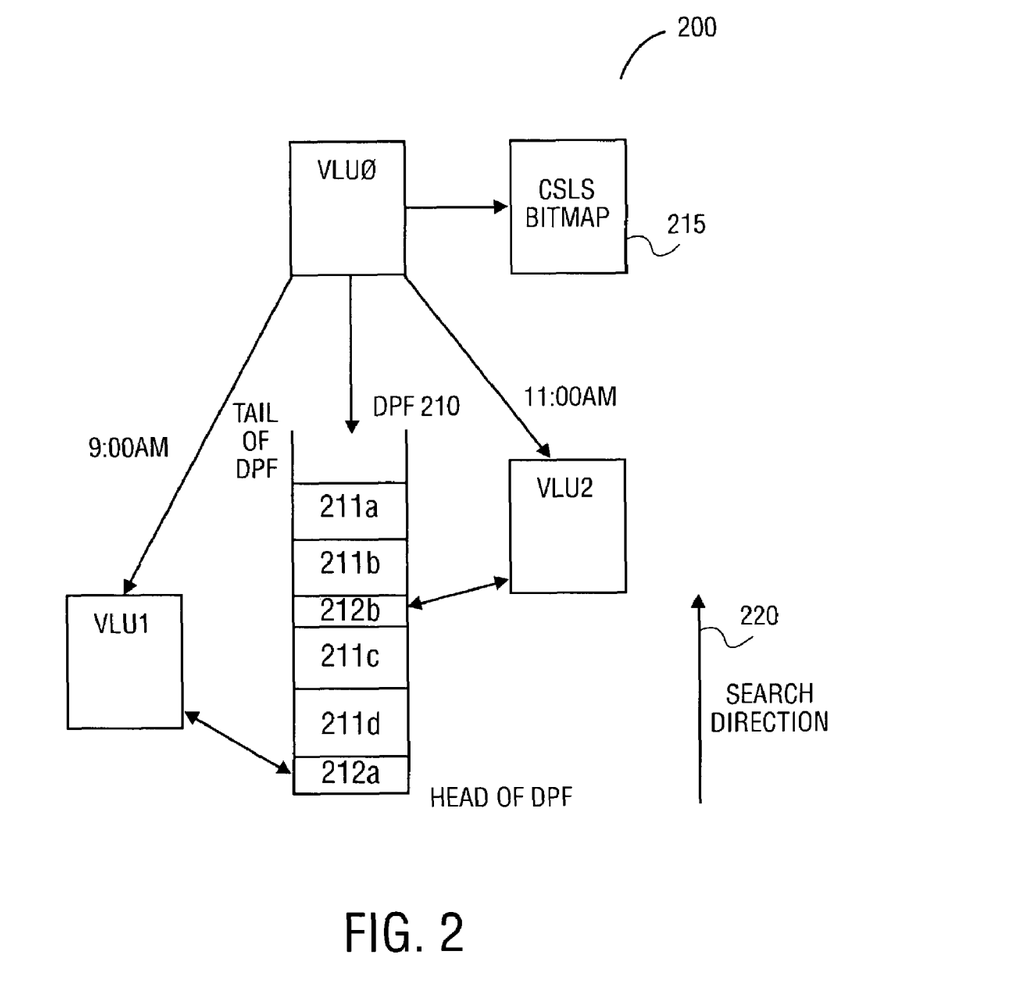
FIG. 2 illustrates a system in which a deferred propagation data structure is implemented in accordance with one embodiment of the invention.

FIG. 2 illustrates a system in which a deferred propagation data structure is implemented in accordance with one embodiment of the invention. System 200, shown in FIG. 2, includes an original, or parent VLU, VLU0, and two snapshots of VLU0, namely, VLU1 and VLU2. VLU1 and VLU2 are an example of a repeated snapshot of VLU0, with VLU1 having been created at, for example, 9:00 A.M., and VLU2 having been created at, for example, 11:00 A.M, both having VLU0 as their parent VLU.

In accordance with one embodiment of the invention, a DPF 210 and a CSLS bitmap 215 are associated with parent VLU0. The DPF contains a number of propagation records, shown as propagation records 211a–211d, containing the old version of a data block and its address (i.e., VBA). The DPF also contains a number of separators, shown as separators 212a and 212b, each contains a pointer to a respective snapshot. That is, each separator corresponds to one of the child VLUs. For example, 212a contains a pointer to the snapshot contained in VLU1 and separator 212b contains a pointer to the snapshot contained in VLU2.

For one embodiment, the CSLS bitmap 215 contains one bit for each data block in the VLU. A value of 1 indicates that a version of the corresponding data block has been propagated into the DPF subsequent to the time the last snapshot of the parent VLU (i.e., VLU0) was created. A value of 0 indicates that no propagation record pertaining to the data block has been entered into the DPF subsequent to the time the last snapshot of the parent VLU (i.e., VLU0) was created.

Figure 3:
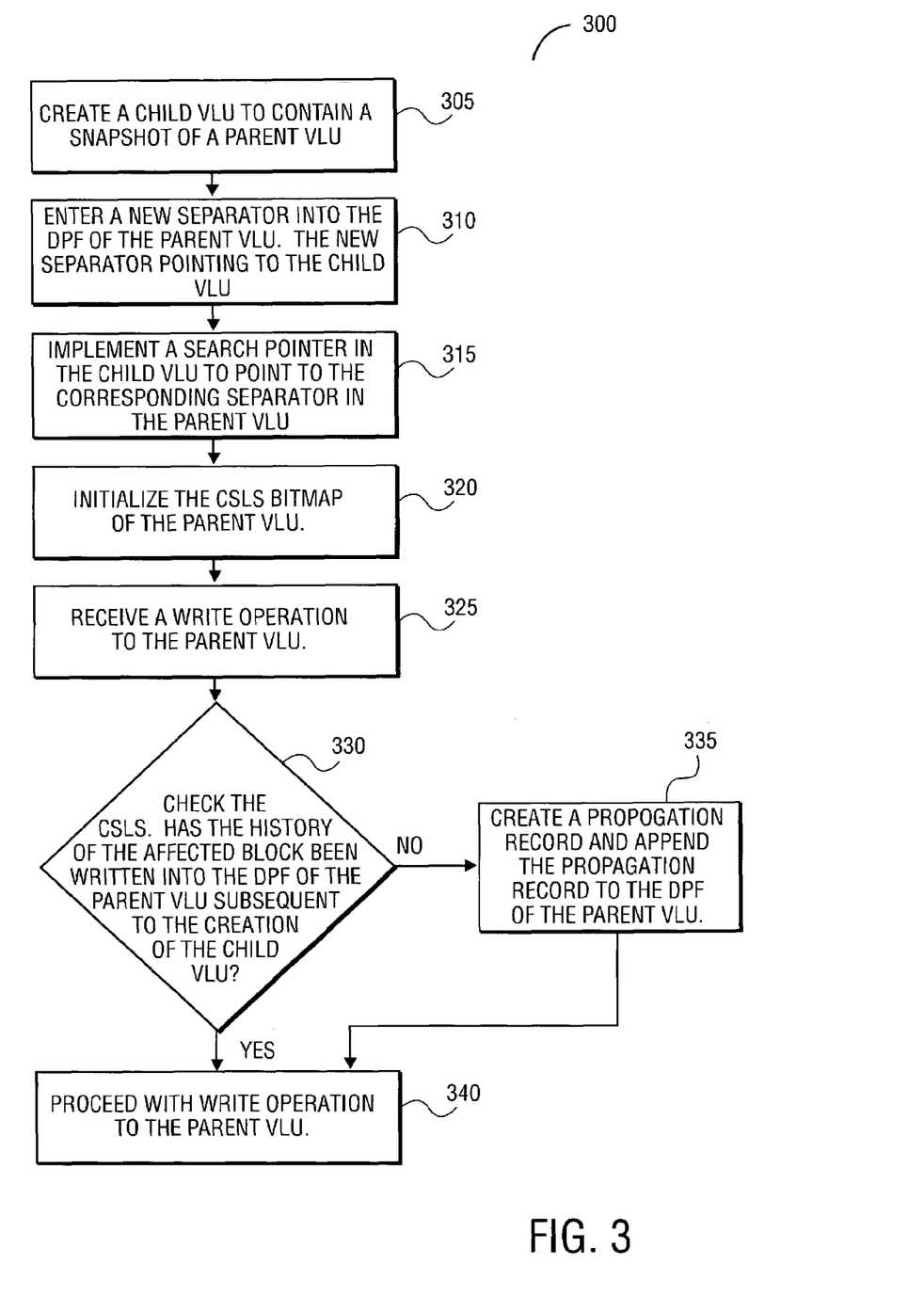
FIG. 3 illustrates a process by which a deferred propagation data structure for a parent VLU is used to reduce the performance impact of WRITE operations to the parent VLU in accordance with one embodiment of the invention.

A READ operation to the parent VLU is processed directly, that is, the corresponding data block within the parent VLU is returned to the requestor. FIG. 3 illustrates a process by which a deferred propagation data structure for a parent VLU is used to reduce the performance impact of WRITE operations to the parent VLU. Process 300, shown in FIG. 3, begins at operation 305 in which a new snapshot is created for a parent VLU. For example, referring again to FIG. 2, at 11:00 A.M., a new snapshot is created of VLU0 (i.e., VLU2 is created). At operation 310 a new separator is entered into the DPF of the parent VLU. For example, separator 212b is entered into DPF 210. The new separator points to the newly created child VLU. At operation 315 a 'search' pointer is implemented in the new child VLU. The search pointer is used to point back to the corresponding separator in the DPF of the parent VLU. At operation 320 the CSLS bitmap of the parent VLU is also initialized (e.g., all values set to zero). At operation 325 the parent VLU receives a WRITE operation. At operation 330 the controller checks the CSLS bitmap to determine if a version of the affected block has previously been written into the DPF subsequent to the creation of the last child VLU (i.e., subsequent to the last snapshot). If not, the controller creates a propagation record containing the history (existing version) of the affected data block and its address, and appends the propagation record to the DPF of the parent VLU, and the CSLS is updated to reflect this change, at operation 335. The controller proceeds with the update to the parent VLU at operation 340. If, at operation 330, the controller determines that a version of the affected block has previously been written into the DPF subsequent to the creation of the last child VLU, the controller proceeds directly with the update to the parent VLU at operation 340. Thus, because the history is not propagated to all child VLUs upon receipt of a WRITE request, but only to the DPF of the parent VLU, the performance impact of WRITE operations is reduced. That is, the efficiency of WRITE operations is increased because the controller only needs to append a record (if not already done since the last snapshot) to the DPF of the parent VLU before the update can be performed.

Figure 4:
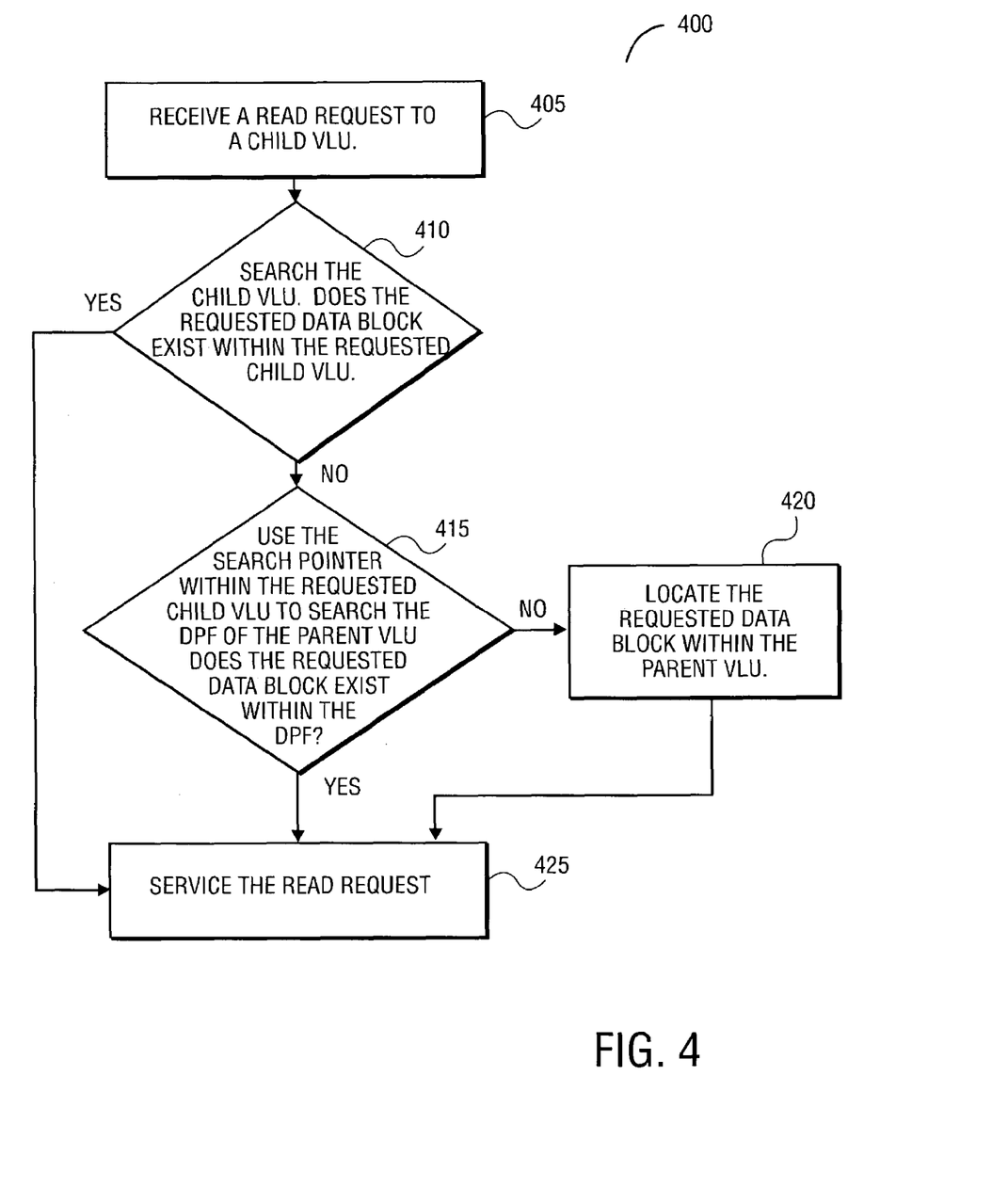
FIG. 4 illustrates a process by which a deferred propagation data structure for a parent VLU is used to reduce the performance impact of READ operations to the child VLU (s) in accordance with one embodiment of the invention.

FIG. 4 illustrates a process by which a deferred propagation data structure for a parent VLU is used to reduce the performance impact of READ operations to the child VLU (s). Process 400, shown in FIG. 4, begins at operation 405 in which a READ operation is subsequently received by a child VLU. At operation 410 the controller searches to determine if a local copy of the requested data block already exists in the requested child VLU. If not, at operation 415 the controller follows the 'search' pointer implemented within the child VLU and attempts to locate the requested block in the DPF of the parent VLU. Referring again to FIG. 2, the arrow 220 indicates the direction in which the DPF is searched for one embodiment. As indicated, the search direction of DPF 210 is from the head of the DPF (i.e., separator 212a) towards the tail of the DPF (i.e., propagation record 211a). The search is performed starting at the separator corresponding to the requested child VLU, towards the tail of the DPF, if the requested data block is located in the DPF of the parent VLU, the READ request is serviced at operation 425. If the search fails to find the requested data block in the DPF of the parent VLU, then the requested data block is located in the parent VLU at operation 420 and the READ request is serviced. If, at operation 410, the controller determines that a local copy of the requested data block already exists in the requested child VLU, then at operation 425 the READ request is serviced directly.

A write to a child VLU is processed directly/locally without any search; that is, provided that the child VLU is not also a parent to another VLU.

Thus, the efficiency of READ operations to the Child VLUs is also improved, as the controller needs to search in at most three places, namely, the requested child VLU, the DPF of the parent VLU, and the parent VLU itself.

Reducing the DPF

With repeated WRITE operations to the parent over time, the DPF can grow to be quite large, causing a search of the DPF to become slow. To control the size of the DPF, the system also executes a background task, to continuously apply the propagation records into the snapshots (child VLUs). When applying the propagation records, the system picks a separator within the DPF, and applies the propagation in an order that is the same as the search direction, starting with the propagation records immediately following the chosen separator. For one embodiment, the separator at the head of the DPF may be chosen as a starting point. When propagating the data blocks to the child VLUs, a copy of the data block from the propagation record is written into the child VLU only if a local copy does not already exist in that VLU. As the records are thus propagated into the child VLU, the corresponding separator is moved towards the tail of the PDF, past the propagated record that has just been processed.

Note that since the separators can be moved independently, the controller may choose to apply the propagation records more quickly into child VLUs that are more active (i.e., being accessed more often), relative to those that are not used much (i.e., trading off the performance of seldom used VLUs for better performance in active VLUs).

As each record is applied, a local copy of the data block is written into the snapshot, and the separator/search pointers adjusted accordingly. For one embodiment, if the separator being adjusted happens to be pushed to the head of the DPF after the separator has been adjusted correspondingly, then the propagation record is also removed from the DPF. Otherwise, the separator is simply moved past the record in the DPF. In such an embodiment, the deferred propagation data structure may not be implemented as a strict FIFO structure and instead may be implemented as a queue that allows insertion of entries in the middle of the queue.

Figure 5:
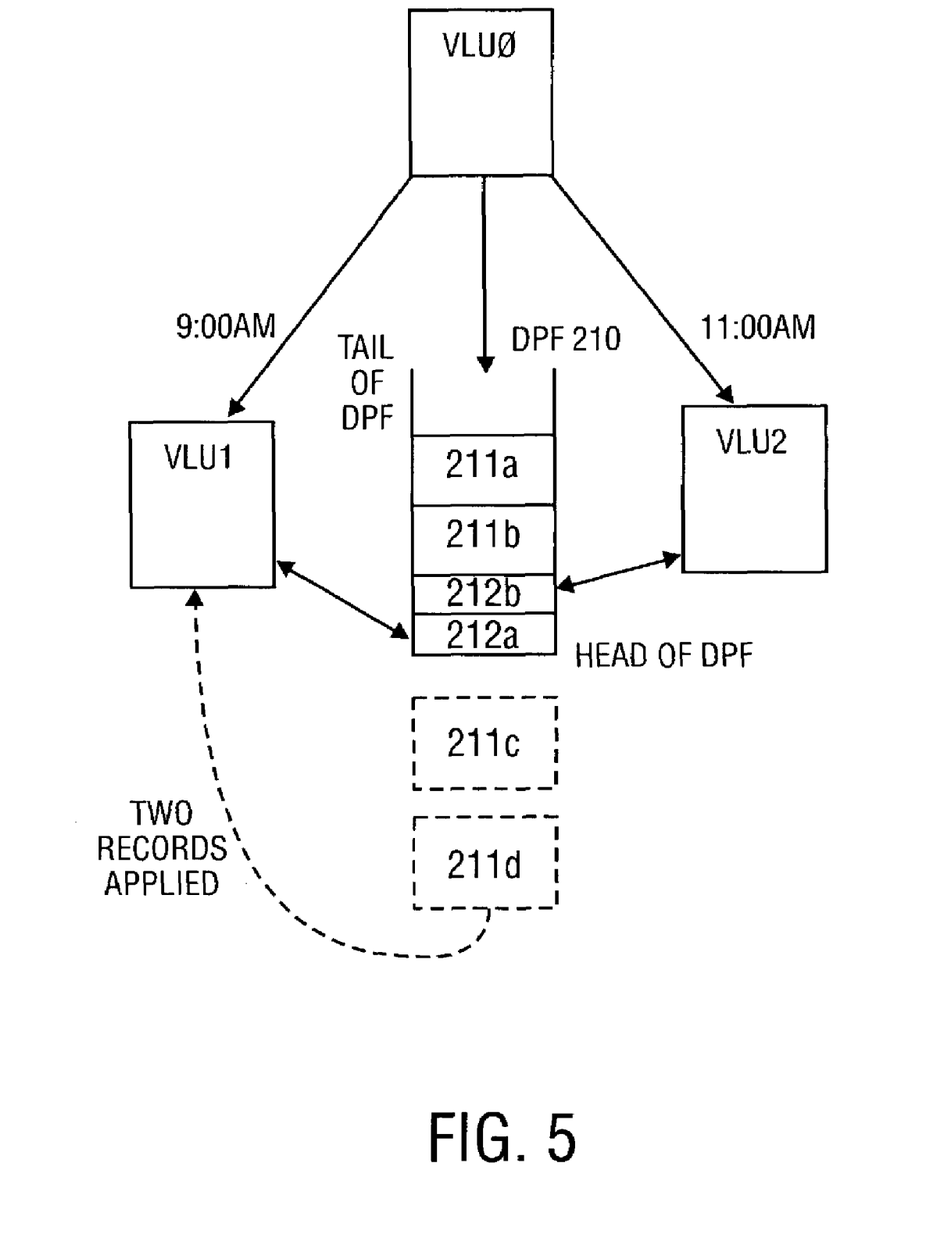
FIG. 5 illustrates a previously created separator catching up with a newer separator as propagation records are applied to the corresponding child VLU in accordance with one embodiment of the invention.

As the propagation of the histories to the child VLUs continues, an older separator may "catch up" with a subsequent separator. FIG. 5 illustrates a previously created separator catching up with a newer separator as propagation records are applied to the corresponding child VLU. FIG. 5 shows the system of FIG. 2 in which propagation records 211d and 211c of DPF 210 (associated with parent VLU0) have now been applied to child VLU1. Separator 212a, corresponding to VLU1 has now caught up with separator 212b, corresponding to VLU2. At this point, the controller may either continue applying the propagation records to the VLU1 (the older VLU) and adjust separator 212a past the separator 212b, or the controller may switch to applying propagation records to separator 212b instead. That is, the separators can be handled independently from one another, as long as a propagation record is not removed from the DPF until there are no more separators between it and the head of the DPF.

Therefore, as the propagation records are gradually applied, the DPF also shrinks in size so that any search within the DPF can be completed more quickly.

Cascaded VLUs

Figure 6:
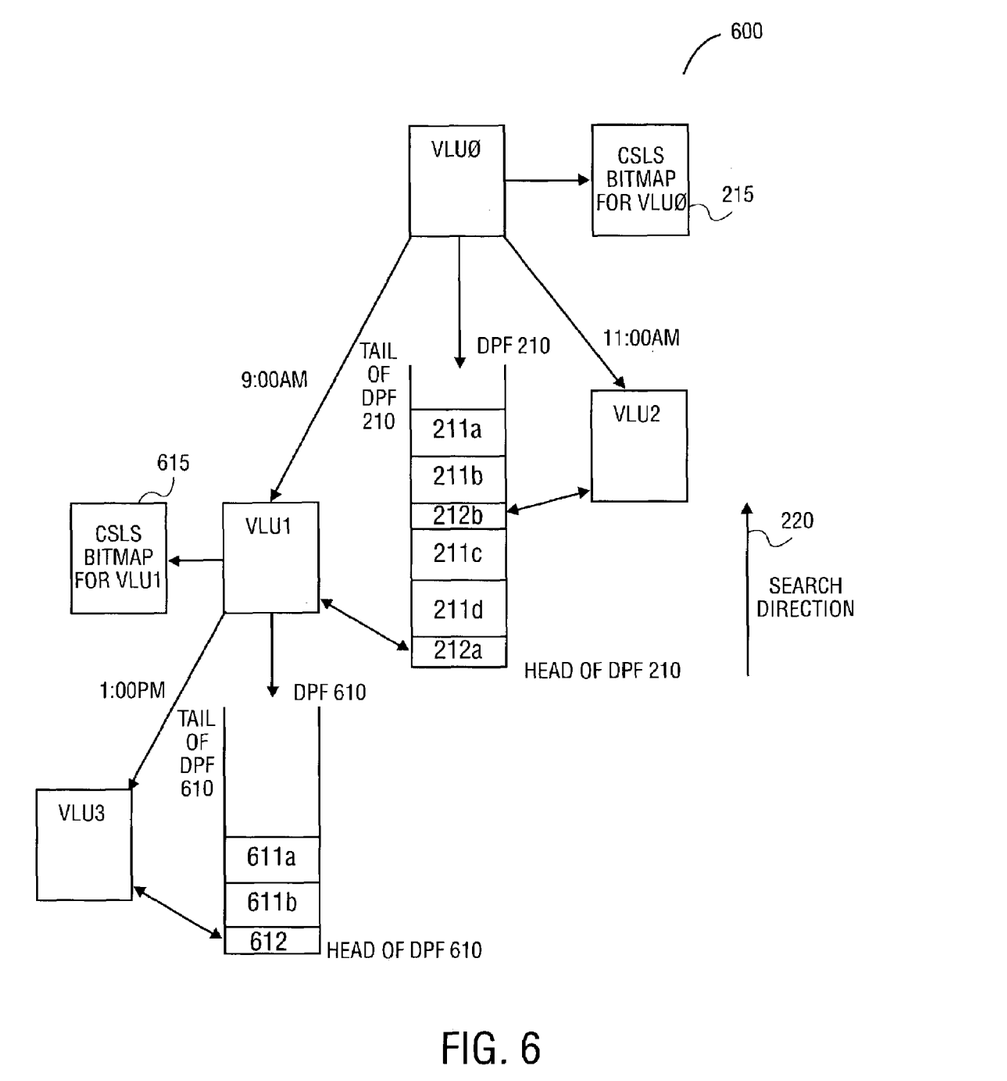
FIG. 6 illustrates the implementation of a deferred propagation data structure to a system having cascaded VLUs in accordance with one embodiment of the invention.

FIG. 6 illustrates the implementation of a deferred propagation data structure to a system having cascaded VLUs in accordance with one embodiment of the invention. System 600 shows system 200, in which a snapshot of VLU1 has been created at 1:00 P.M. VLU3 has been created to contain the snapshot of VLU1. Therefore, VLU 1 is now a parent VLU (of VLU3) and remains a child VLU (of VLU0). System 600 also includes DPF 610 and CSLS bitmap 615, which are associated with VLU1. DPF 610 contains a number of propagation records, shown as propagation records 611a and 611b, that contain the old version of a data block and its address (i.e., VBA) created when VLU1 was written to. DPF 610 also contains a separator, shown as separator 612 that contains a pointer to snapshot VLU3.

The method of associating a DPF and a CSLS bitmap with the parent VLU is applied recursively to each parent VLU in the system. That is, each parent VLU has its own DPF and CSLS bitmap, and each child VLU points to the DPF of its parent VLU (the child VLUs do not point beyond their respective parent VLUs).

Deleting a VLU

It may be expedient in various applications to delete a VLU from the system. For example, a snapshot of a financial record may be created daily, with fewer snapshots preserved on a long-term basis (e.g., one snapshot per month for snapshots more than a year old). In accordance with one embodiment of the invention, if a child VLU that is not itself also a parent is deleted, its separator is simply removed from the parent's DPF. If the separator of the deleted child VLU happens to be the one currently at the head of the DPF, then the system also removes all of the records in the DPF up to the next separator.

Figure 7:
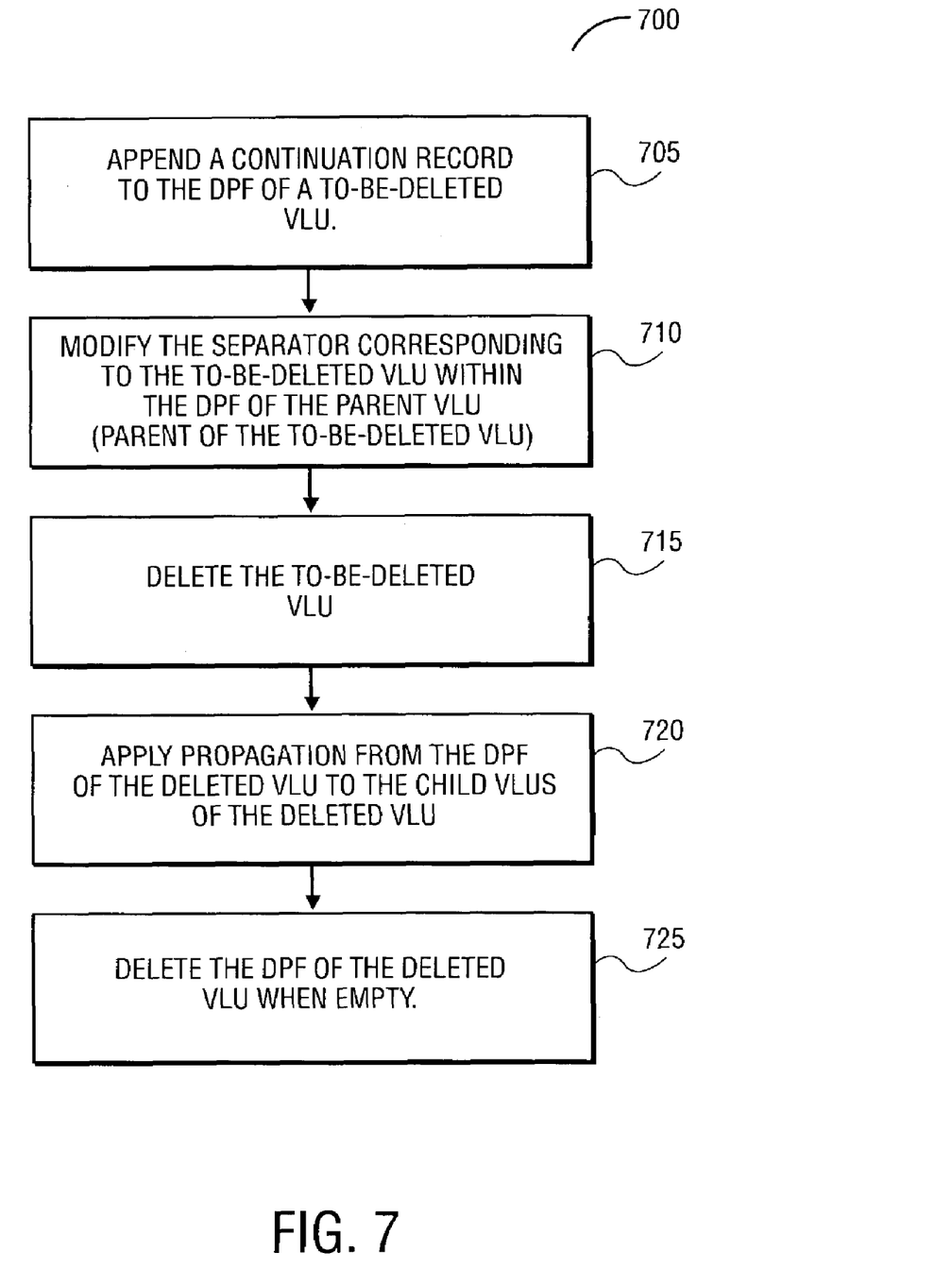
FIG. 7 illustrates a process in which a child VLU that is also a parent VLU is deleted from the system in accordance with one embodiment of the invention.

FIG. 7 illustrates a process in which a child VLU that is also a parent VLU is deleted from the system. Process 700, shown in FIG. 7, begins with operation 705 in which a "continuation record" is appended to the DPF of the to-be-deleted VLU (tbdVLU). The continuation record contains a pointer that is set to point to the separator corresponding to the tbdVLU, within the DPF of its parent VLU.

At operation 710, the separator corresponding to the tbdVLU is modified within its parent's DPF, to point to the DPF of the tbdVLU.

At operation 715 the tbdVLU is removed from the system.

At operation 720 the system continues to apply propagation records to the child VLUs of the now-deleted VLU (deleted VLU). When there are no more propagation records left in that DPF of the deleted VLU, the system follows the continuation record pointer, and continues applying propagation records from the grandparent's DPF. The separator corresponding to child VLUs of the deleted VLU are moved from the deleted VLU's DPF to the DPF of the deleted VLU's parent (inserted behind the location previously holding the deleted VLU's separator).

At operation 725 the DPF of the deleted VLU is deleted when it becomes empty. Thus, the deletion of a child VLU that is itself a parent VLU within a system of cascaded VLUs can be deleted without loss of data.

General Matters

Embodiments of the invention may be implemented to reduce the time between when a WRITE operation is received to a parent VLU and when the WRITE can be processed. A deferred propagation data structure is employed to store the history. After the history is appended to the data structure the update of the parent VLU may proceed. There is no need to propagate the history to all of the corresponding child VLUs prior to processing the WRITE operation. While the deferred propagation data structure is described as a FIFO, it may be otherwise in alternative embodiments. Embodiments of the invention exploit a "bursty" data access pattern by deferring the propagation of the data block history until after the WRITE operation is processed.

The efficiency of READ operations is improved as well, as the requested data may reside in one of only three locations, namely, the requested child VLU, the deferred propagation data structure associated with the parent VLU of the requested child VLU, or the parent VLU itself. With the increasing size of the DPF, the READ operations may take longer. However, again exploiting a bursty data access pattern, the DPF can be reduced in the interim between data access requests.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative rather than limiting.

What is claimed is:

1. A method comprising:
   receiving a command to create a point-in-time copy of an original data store, the original data store stored to a parent virtual logical unit (VLU) having associated therewith a deferred propagation data structure, the deferred propagation data structure capable of containing a plurality of data propagation records and a plurality of separators, each data propagation record containing a previous version of one or more data blocks of the parent VLU, each separator containing a pointer to a particular child VLU storing a point-in-time copy of the original data store and separating the data propagation records pertaining to the particular child VLU;
   creating a child VLU to store the point-in-time copy of the original data store;
   entering a new separator into the data propagation data structure, the new separator containing a pointer to the child VLU; and
   implementing a search pointer in the child VLU, the search pointer pointing to the deferred propagation data structure.

2. The method of claim 1 wherein the deferred propagation data structure is implemented as a deferred propagation first-in-first-out data structure.

3. The method of claim 2 wherein each parent VLU and each child VLU has an associated metadata structure organized as a tree of metadata slabs, each tree of metadata slabs including a plurality of slabs, each slab containing a metadata table having a plurality of entries, each entry representing a contiguous range of block addresses and containing a cache pointer to a slot of a random access memory, the slot storing a data block corresponding to the block address, a block address range indicator to indicate the contiguous range of block addresses, and at least one slab pointer, each slab pointer pointing to a parent slab or a child slab.

4. The method of claim 3 wherein the parent VLU has a bitmap associated therewith, the bitmap indicating data blocks that have been copied to the deferred propagation data structure subsequent to a creation of a point-in-time copy of the original data store.

5. The method of claim 4 further comprising:
   initializing the bitmap of the parent VLU;
   receiving a WRITE operation to the parent VLU, the WRITE operation affecting one or more data blocks of the parent VLU;
   checking the bitmap to determine if the affected data blocks have been copied to the deferred propagation data structure associated with the parent VLU and if not, appending a propagation record to the deferred propagation data structure of the parent VLU; and
   processing the WRITE operation to the parent VLU.

6. The method of claim 4 further comprising:
   receiving a READ operation to the child VLU, the READ request affecting one or more data blocks;
   searching the child VLU to determine if the affected data blocks are stored in the child VLU;
   using the search pointer in the child VLU to determine if the affected data blocks are stored in the deferred propagation data structure of the parent VLU if the affected data blocks are not stored in the child VLU;
   locating the affected data blocks within the parent VLU if the affected data blocks are not stored in the deferred propagation data structure; and
   processing the READ operation to the child VLU.

7. The method of claim 5 further comprising:
   selecting a separator within the deferred propagation data structure of the parent VLU;
   determining if a copy of the affected data blocks represented in the propagation record has been previously copied to the particular child VLU; and
   copying the affected data blocks to the particular child VLU if the child VLU does not already contain valid data blocks associated with a block address represented by the propagation record.

8. The method of claim 7 wherein the selected separator is at a head of the deferred propagation data structure, the method further comprising:
   moving the selected separator beyond the propagation record.

9. The method of claim 8 wherein, subsequent to moving the selected separator beyond the propagation record, the propagation record is at a head of the deferred propagation data structure, the method further comprising:
   deleting the propagation record from the deferred propagation data structure.

10. A memory for storing data comprising:
    a data structure stored on the memory, the data structure capable of containing a plurality of data propagation records and a plurality of separators, each data propagation record containing a previous version of one or more data blocks of an original data store stored to a parent virtual logical unit (VLU), each separator containing a pointer to a particular child VLU, the child VLU storing a point-in-time copy of the original data store and separating the data propagation records pertaining to the particular child VLU.

11. The memory for storing data of claim 10 wherein the data structure is implemented as a first-in-first-out data structure.

12. The memory for storing data of claim 11 further comprising:
    a plurality of metadata structure stored on the memory, wherein each metadata structure is associated with a parent VLU or a child VLU, each metadata structure organized as a tree of metadata slabs, each tree of metadata slabs including a plurality of slabs, each slab containing a metadata table having a plurality of entries, each entry representing a contiguous range of block addresses and containing a cache pointer to a slot of a random access memory, the slot storing a data block corresponding to the block address, a block address range indicator to indicate the contiguous range of block addresses, and at least one slab pointer, each slab pointer pointing to a parent slab or a child slab.

13. The memory for storing data of claim 11 further comprising:
a bitmap stored on the memory, the bitmap associated with a parent VLU, the bitmap indicating data blocks that have been copied to the data structure subsequent to the creation of a point-in-time copy of the original data store.

14. An article of manufacture comprising:
a computer usable medium having one or more executable instructions stored thereon, which when executed by a digital processing system, cause the digital processing system to perform a method, the method comprising:
receiving a command to create a point-in-time copy of an original data store, the original data store stored to a parent virtual logical unit (VLU) having associated therewith a deferred propagation data structure, the deferred propagation data structure capable of containing a plurality of data propagation records and a plurality of separators, each data propagation record containing a previous version of one or more data blocks of the parent VLU, each separator containing a pointer to a particular child VLU storing a point-in-time copy of the original data store and separating the data propagation records pertaining to the particular child VLU;
creating a child VLU to store the point-in-time copy of the original data store;
entering a new separator into the data propagation data structure, the new separator containing a pointer to the child VLU; and
implementing a search pointer in the child VLU, the search pointer pointing to the deferred propagation data structure.

15. The article of manufacture of claim 14 wherein the deferred propagation data structure is implemented as a deferred propagation first-in-first-out data structure.

16. The article of manufacture of claim 15 wherein each parent VLU and each child VLU has an associated metadata structure organized as a tree of metadata slabs, each tree of metadata slabs including a plurality of slabs, each slab containing a metadata table having a plurality of entries, each entry representing a contiguous range of block addresses and containing a cache pointer to a slot of a random access memory, the slot storing a data block corresponding to the block address, a block address range indicator to indicate the contiguous range of block addresses, and at least one slab pointer, each slab pointer pointing to a parent slab or a child slab.

17. The article of manufacture of claim 16 wherein the parent VLU has a bitmap associated therewith, the bitmap indicating data blocks that have been copied to the deferred propagation data structure subsequent to the creation of a point-in-time copy of the original data store.

18. The article of manufacture of claim 17 wherein the method further comprises:
initializing the bitmap of the parent VLU;
receiving a WRITE operation to the parent VLU, the WRITE operation affecting one or more data blocks of the parent VLU;
checking the bitmap to determine if the affected data blocks have been copied to the deferred propagation data structure associated with the parent VLU and if not, appending a propagation record to the deferred propagation data structure of the parent VLU; and
processing the WRITE operation to the parent VLU.

19. The article of manufacture of claim 18 wherein the method further comprises:
receiving a READ operation to the child VLU, the READ request affecting one or more data blocks;
searching the child VLU to determine if the affected data blocks are stored in the child VLU;
using the search pointer in the child VLU to determine if the affected data blocks are stored in the deferred propagation data structure of the parent VLU, if the affected data blocks are not stored in the child VLU;
locating the affected data blocks within the parent VLU if the affected data blocks are not stored in the deferred propagation data structure; and
processing the READ operation to the child VLU.

20. The article of manufacture of claim 19 wherein the method further comprises:
selecting a separator within the deferred propagation data structure of the parent VLU;
determining if a copy of the affected data blocks represented in the propagation record has been previously copied to the particular child VLU; and
copying the affected data blocks to the particular child VLU if the child VLU does not already contain valid data blocks associated with a block address represented by the propagation record.

21. The article of manufacture of claim 20 wherein the selected separator is at a head of the deferred propagation data structure, the method further comprises:
moving the selected separator beyond the propagation record.

22. The article of manufacture of claim 21 wherein subsequent to moving the selected separator beyond the propagation record, the propagation record is at a head of the deferred propagation data structure, the method further comprising:
deleting the propagation record from the deferred propagation data structure.

23. A data storage system comprising:
a storage media;
a processing system;
a memory, coupled to the processing system, characterized in that the memory has stored therein instructions which, when executed by the processing system, cause the processing system to receive a command to create a point-in-time copy of an original data store, the original data store stored to a parent virtual logical unit (VLU) having associated therewith a deferred propagation data structure, the deferred propagation data structure capable of containing a plurality of data propagation records and a plurality of separators, each data propagation record containing a previous version of one or more data blocks of the parent VLU, each separator containing a pointer to a particular child VLU storing a point-in-time copy of the original data store and separating the data propagation records pertaining to the particular child VLU;
create a child VLU to store the point-in-time copy of the original data store;
enter a new separator into the data propagation data structure, the new separator containing a pointer to the child VLU; and
implement a search pointer in the child VLU, the search pointer pointing to the deferred propagation data structure.

24. The data storage system of claim 23 wherein the deferred propagation data structure is implemented as a deferred propagation first-in-first-out data structure.

25. The data storage system of claim 24 wherein each parent VLU and each child VLU has an associated metadata structure organized as a tree of metadata slabs, each tree of metadata slabs including a plurality of slabs, each slab containing a metadata table having a plurality of entries, each entry representing a contiguous range of block addresses and containing a cache pointer to a slot of a random access memory, the slot storing a data block corresponding to the block address, a block address range indicator to indicate the contiguous range of block addresses, and at least one slab pointer, each slab pointer pointing to a parent slab or a child slab.

26. The data storage system of claim 25 wherein the parent VLU has a bitmap associated therewith, the bitmap indicating data blocks that have been copied to the deferred propagation data structure subsequent to the creation of a point-in-time copy of the original data store.

27. The data storage system of claim 26 wherein the instructions further cause the processing system to initialize the bitmap of the parent VLU, receive a WRITE operation to the parent VLU, the WRITE operation affecting one or more data blocks of the parent VLU, check the bitmap to determine if the affected data blocks have been copied to the deferred propagation data structure associated with the parent VLU and if not, appending a propagation record to the deferred propagation data structure of the parent VLU and process the WRITE operation to the parent VLU.

28. The data storage system of claim 26 wherein the instructions further cause the processing system to receive a READ operation to the child VLU, the READ request affecting one or more data blocks, search the child VLU to determine if the affected data blocks are stored in the child VLU, use the search pointer in the child VLU to determine if the affected data blocks are stored in the deferred propagation data structure of the parent VLU, if the affected data blocks are not stored in the child VLU, locate the affected data blocks within the parent VLU if the affected data blocks are not stored in the deferred propagation data structure, and process the READ operation to the child VLU.

29. The data storage system of claim 28 wherein the instructions further cause the processing system to select a separator within the deferred propagation data structure of the parent VLU, determine if a copy of the affected data blocks represented in the propagation record has been previously copied to the particular child VLU, and copy the affected data blocks to the particular child VLU if the child VLU does not already contain valid data blocks associated with a block address represented by the propagation record.

30. The data storage system of claim 29 wherein the instructions further cause the processing system to move the selected separator beyond the propagation record.

31. The data storage system of claim 30 wherein subsequent to moving the selected separator beyond the propagation record, the propagation record is at a head of the deferred propagation data structure, and wherein the instructions further cause the processing system to delete the propagation record from the deferred propagation data structure.

* * * * *